`United States Patent` [19]

Sokol

[11] 3,812,844

[45] May 28, 1974

[54] APPARATUS FOR MEASURING BLOOD PRESSURE WITH CORRESPONDING CUFF SECTIONS AND INDICATION RANGES

[76] Inventor: Kurt Rudolf Franz Sokol, Schwachhauser Heerstrabe 295, 28 Bremen, Germany

[22] Filed: May 26, 1971

[21] Appl. No.: 147,034

[52] U.S. Cl. ..................... 128/2.05 G, 128/2.05 C
[51] Int. Cl. .............................................. A61b 5/02
[58] Field of Search..... 128/2.05 A, 2.05 C, 2.05 G, 128/2.05 M, 2.05 P, 2.05 Q, 2.05 R, 2 R, 2 S; 73/388, 397, 402, 406, 469, 41 B, 415, 379 R, 431; 116/129 A, 136 S; 33/174 D, 176, 178 C

[56] References Cited
UNITED STATES PATENTS

| | | | |
|---|---|---|---|
| 2,609,691 | 9/1952 | Kirwin | 73/431 |
| 2,989,051 | 6/1961 | Zuidema et al | 128/2.05 Q |
| 3,056,299 | 10/1962 | Kormendy | 73/402 |
| 3,699,945 | 10/1972 | Hanafin | 128/2.05 C |

FOREIGN PATENTS OR APPLICATIONS

| | | | |
|---|---|---|---|
| 756,704 | 9/1933 | France | 128/2.05 G |

*Primary Examiner*—William E. Kamm
*Attorney, Agent, or Firm*—Olson, Trexler, Wolters, Bushnell & Fosse, Ltd.

[57] ABSTRACT

Apparatus for measuring blood pressure, with automatic compensation for variation in limb diameter, includes a bandage and a measuring apparatus indicating unit connected thereto. The bandage is subdivided along its length into a plurality of sections, each of which is associated with its own indicating zone in the measuring apparatus. The subdivisions can be visual. Alternatively, they can be by means of electrical contacts or a resistor extending longitudinally of the bandage; in which case the use of the apparatus can be simplified by the incorporation of rotating sealers or pointers actuated by circuitry responsive to the effective length of bandage in use.

14 Claims, 10 Drawing Figures

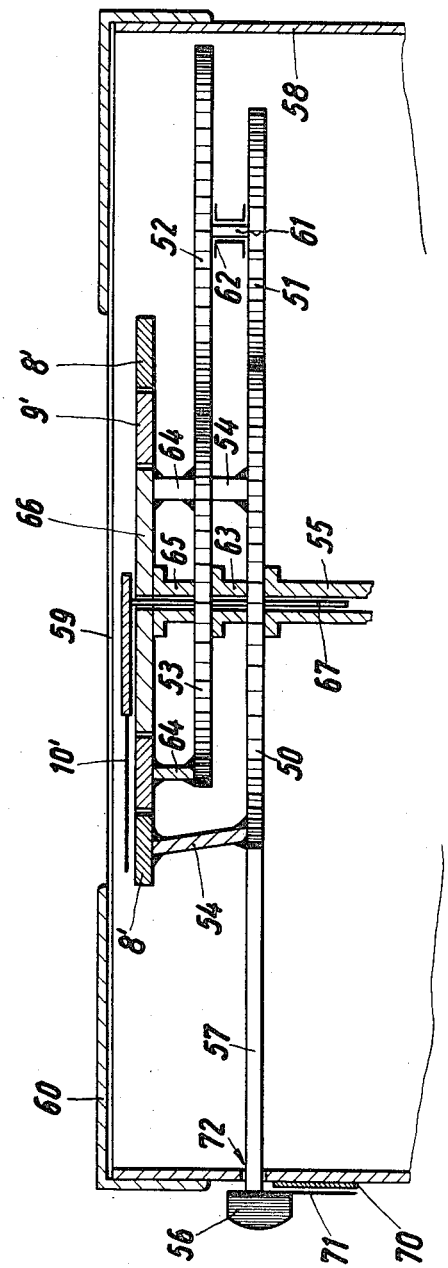

APPARATUS FOR MEASURING BLOOD PRESSURE WITH CORRESPONDING CUFF SECTIONS AND INDICATION RANGES

The invention relates to apparatus for measuring blood pressure with a bandage and a measuring unit, having at least one indicating instrument and being connected to said bandage.

Different forms of apparatus are known for defining the blood pressure, for example the apparatus devised by Riva-Rocci and Korotkoff, such apparatus being adapted to operate with a bandage and a stethoscope. The bandage may for example be attached to the upper arm and may be pressurised with air until no sounds are audible with the stethoscope. The pressure in the bandage is then gradually released until the first sounds once again become audible; the pressure which is effective at that moment of time in the bandage will correspond to the systolic blood pressure. Further reduction of the pressure causes the sounds to disappear and the residual pressure in the bandage then corresponds to the diastolic pressure.

The prior art furthermore discloses automatically operating blood pressure measuring units which also operate with an inflatable bandage; the bandages contain one or more microphones for recording the sound to render it audible through an amplifier and loudspeakers.

Apparatus of this kind also contain an air pump as well as a pressure transducer connected thereto, the output signal of said transducer depending on the prevailing pressure in the bandage and being transmitted via an amplifier to an indicating unit. Apparatus of this kind operates almost completely automatically: depressing a button causes the bandage to be inflated and the pressure to be gradually released so that it is necessary merely to read off the associated pressure values from the instrument during deflation and when the sound occur and disappear respectively.

The known kind of apparatus provides a perfectly usable function but is not completely satisfactory; it is known from different medical publications that the pressure defined with known apparatus depends on the diameter of the limbs to which the bandage is attached. The indicated values of systolic and diastolic pressure will therefore differ, even under conditions of simultaneous measurement, namely relative to the measuring position. For example, if a bandage is placed around the upper thigh and a further bandage around the upper arm, the indicated pressure values will differ and not correspond to the actual pressure.

In order to compensate for this error it is known to measure the circumference of the limb and to modify the indicated pressure value by a correcting value obtained from a table. This correction method is not only time consuming and awkward but also not reliable because it is easy for errors to occur when measuring the diameter and when locating the correcting values.

It is therefore the object of the invention to provide apparatus which provides the said correction automatically and without any additional effort during measurement.

To solve this problem a bandage is used in accordance with the invention which is sub-divided along its longitudinal dimension into a plurality of sections each of which is associated with its own indicating range in the measuring unit.

To this end, the bandage in one embodiment of the invention may be sub-divided in simple manner into zones of different colouring or numbering with which a correspondingly coloured or numbered scale of the indicating unit is associated. When the bandage is applied, its end, disposed upwardly, may for example be disposed in a blue-coloured zone so that the values are obtained from a blue scale on the indicating unit. For another limb diameter the bandage may for example terminate above a red zone so that in this case the correct pressure value is obtained from a red scale of the indicating unit.

In this way, the problem is solved comletely and with simple means because the previously possible sources of error have been eliminated.

In an advantageous second embodiment of the invention the bandage is provided with a common contact — for example in the form of a hook — in the zone of one of its ends, said contact being connected to one of a number of individual contacts, also provided on the bandage — for example in the form of metal rods — to close a circuit, corresponding to the appropriate individual contact and therefore corresponding to the effective length of the bandage, the said circuit being adapted to switch on the associated indicating range in the measuring unit and/or is adapted to mark same with a lamp or the like. With this further development it is possible for measurement to be further simplified without any substantial additional effort and without increasing the possibility of introducing errors.

In a third embodiment of the invention the bandage is once again provided with a common contact as well as with at least one resistor element disposed along the longitudinal extension of the said bandage, the circuit being connected on the one hand to the contact and on the other hand to the resistor element and being part of a bridge branch the output voltage of which is a measure for the circumference of the limb surrounded by the bandage (effective length of the bandage) and being adapted to switch on and/or mark with a lamp or the like the associated indicating range in the measuring unit.

In order to further simplify reading off from the instrument while allowing for the fact that systolic and diastolic pressure vary differently with the circumference of the limb it is advantageous to provide for a relative rotation between pointer and scale or scales of the indicating unit in accordance with the effective length of the bandage. To this end and in a preferred embodiment of the invention each scale of the indicating unit in the measuring apparatus is disposed on a spindle which is connected to a number of rigidly coupled disc cams of which a separate cam is provided for each individual contact and which rotates, when the measuring apparatus is switched on, until the particular contact spring of a plurality of contact springs is energised through the individual bandage contact associated therewith and the common contact when operation by its disc cam interrupts the driving circuit for the disc cam thus stopping the scale at a position corresponding to the effective bandage length. In this way, zero shift of the indication is obtained in simple manner by means of scale rotation.

In another advantageous embodiment of the invention, each section of the bandage operates a separate relay with two normally open contacts of which the first normally open contact is connected on the one hand to a first busbar, connected in the circuit of a first indicating unit, and of which the second normally open contact is connected on the one hand to a second busbar which is connected in the circuit of a second indicating unit. To this end all normally open contacts on the other side are connected to separate trimmer resistors which complete the circuits of the two indicating units. The advantageous relative rotation between pointer and scale in this case is thus obtained by rotation of the pointer with the aid of a trimmer resistor relative to the stationary scale.

The invention is explained hereinbelow by reference to the embodiments which are illustrated in the accompanying drawings in which FIG. 1 is a graph in which systolic and diastolic pressure is plotted against the circumference of the limb;

FIG. 10 is a diagrammatic and enlarged view of a longitudinal section through the indicating unit according to FIG. 8.

Figure 1:
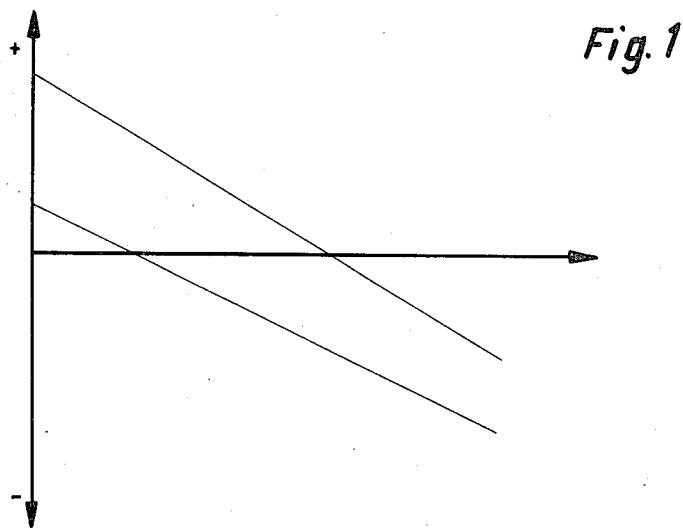

FIG. 1 shows the relationship between the systolic and diastolic pressure and the circumference of the limb on which the measurements are taken. The different slope of the curves and the fact that they pass through the origin at different positions is notable. It can be seen that each value of the abscissa of the diastole and systole is associated with another correcting value, plotted on the ordinate, and employed to correct the measured result. For the sake of completeness it should be noted that in each case it is possible for the correcting values to be either only subtracted or preferably only added by appropriate displacement of the zero point of the apparatus which indicates the pressure.

The different limb circumferences are measured by the bandage 1, required in any case, and which is subdivided into a number of different sections. In the embodiment illustrated in FIG. 2, a plurality of metal rods, which are electrically insulated from each other and which are situated transversely to the longitudinal extension of the bandage 1, are used for such subdividing function. The metal rods 2 form individual contacts of which one, corresponding to the circumference of the limb, co-operates with a hook 3 which forms a common contact and is connected to a current source through a conductor 4. A separate conductor 5 extends from each of the individual contacts or metal bars 2 to the current source or to the measuring apparatus. The conductors 4, 5 as well as an air hose for pressurising the bandage are combined into a cable harness 6 which connects the bandage to the measuring apparatus. In this embodiment of the bandage the hook 3 and the bars 3 are used not only to establish a circuit but are also employed to secure the bandage, for example, on the upper arm. The number of rods 2 or of the individual contacts depends on the resolution of the indication which it is desired to achieve as well as on the normally expected smallest and largest limb diameters which vary between approximately 15 and 50 cm.

Figure 2:
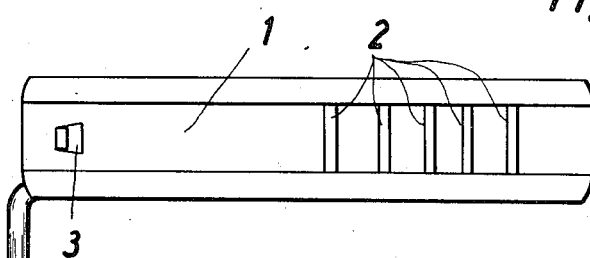
FIG. 2 is a diagrammatic view of a bandage subdivided into sections.

Instead of being provided with the inter-acting contacts illustrated in FIG. 2, the bandage may also be sub-divided into adjoining zones of different colour; in this case, one end of the bandage will be disposed over one of the coloured zones depending on the circumference of the limb. The indicating unit of the measuring apparatus in this case need only have a number of scales corresponding to the number of coloured zones and being coloured in the same manner so that a reading is automatically taken on the scale with the correct colour and therefore the correct measured value is obtained.

In the event that a particularly precise indication is obtained, the individual contacts 2 may be replaced by a resistance wire or the like one end of which is connected to the current source. The said wire co-operated with a fixed contact — corresponding to the contact 3 — so that when the bandage is applied the contact bears on a defined zone of the wire extending longitudinally along the bandage and thus defines the resistance of the wire in accordance with the effective length of the bandage. The individual contact and the resistance wire in this case will form part of a bridge circuit so that the bridge is unbalanced in accordance with the effective length of the bandage. The amount of unbalance once again is a measure for the circumference of the limb and is utilised to apply the correcting value to the measured result.

Figure 3:
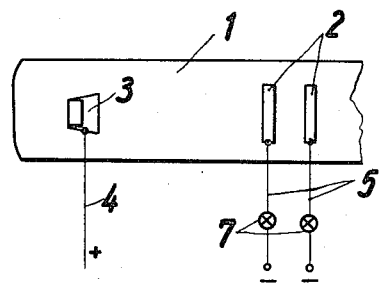
FIG. 3 is a part view of the bandage according to FIG. 2 with the associated circuit.

When using the bandage illustrated in FIGS. 2 and 3 it is possible for a lamp 7 to be connected in the circuit of each individual contact 2. When the sleeve is applied one of the lamps 7 will thus be illuminated. If as many indicating units are provided as there are individual contacts and if one of the lamps is in each case placed into the zone of the associated measuring instrument, the illuminated lamp will indicate the instrument that indicates the correct pressure and the scale of which is displaced relative to all other scales in accordance with the correcting value. It is possible in all cases for separate fixed scales to be provided for the systolic and the diastolic pressure so that the two scales of each measuring unit may be displaced relative to each other by a defined amount; in this way it is possible to compensate for the different positions of the curves as illustrated in FIG. 1. The different slope of the two curves or straight lines cannot however be allowed for in this manner.

Figure 4:
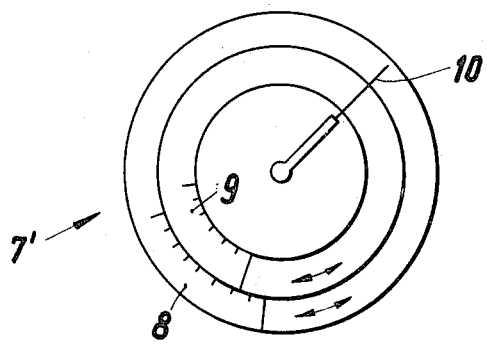
FIG. 4 is the plan view of an indicating unit with two scales adapted to rotate relative to a pointer.
Figure 5:
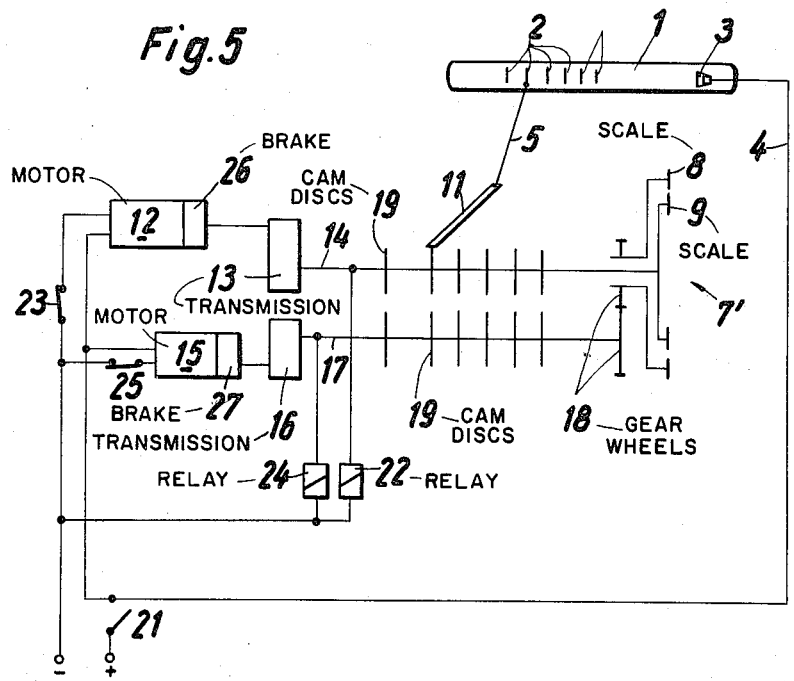
FIG. 5 is a diagrammatic view of apparatus for rotating the two scales relative to the effective length of the bandage.
Figure 6:
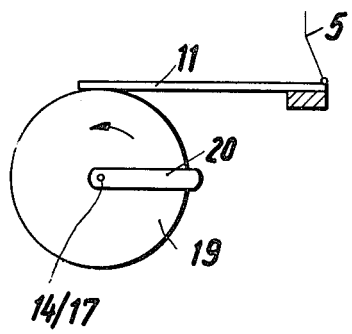
FIG. 6 is the end view of a disc cam employed in conjunction with the apparatus illustrated in FIG. 5

The embodiment of the invention according to FIGS. 4 to 6 allows not only for the different slope of the curves or straight lines but moreover makes it possible to use only one indicating instrument. The said indicating instrument 7 has two scales 8, 9, which can be rotated relative to each other, and a common pointer 10. Apparatus of the kind shown diagrammatically in FIG. 5 is provided to rotate the two scales 8 and 9 relative to the effective bandage length. In the illustrated embodiment a bandage 1 (according to FIG. 2) is used which in the example is provided with five individual contacts 2. Each of the said individual contacts is associated with a pair of contact springs 11 in the apparatus but only one such contact spring is shown. The apparatus contains an electric motor 12 which drives, through a step-down transmission 13, a first cam shaft 14 which in turn directly rotates the inner scale 9. A further electric motor 15 drives, through a transmission 16, a second cam shaft 17 which in turn drives the outer scale 8 through two gear wheels 18.

A number of disc cams 19 of insulating material and corresponding to the number of individual contacts 2 are mounted on each cam shaft 14, 17, said disc cams being rigidly connected to the cam shaft associated therewith. A metal section 20, extending beyond the circumference and forming the actual cam, extends from the metallic cam shaft radially on each disc 19. The cams are mounted on each shaft 14, 17 but offset relative to each other so that the distance between two adjacent cams in the circumferential direction corresponds to the distance between adjacent individual contacts 2. This distance is once again a measure indicating the effective length of the bandage and therefore a measure for the correcting value so that a rotation of the cam shaft corresponding to the distance between two cams results in a rotation of the associated scale corresponding to the distance between two individual contacts; suitable subdivision of the scales in this manner enables due allowance to be made for the correcting value.

A switch 21, which may be part of the apparatus main switch, is actuated to rotate the scales. The said switch switches on both electric motors 12, 15 so that these rotate their associated cam shaft and therefore their associated scale until the individual contact 2, energised through the hook 3, and therefore a contact spring 11 comes into physical contact with the metallic cam 20 of the associated disc cam 19. At this moment of time a circuit will be closed which branches downstream of the switch 21 from the power supply and extends via the hook 3, one of the individual contacts 2, one of the contact springs 11 associated therewith, the cam 20, the cam shaft 14 to a relay 22 which in turn is connected to the current source. Accordingly, the relay 22 will be energised and its normally closed contact 23 will interrupt the supply of current for the motor 12 so that the cam shaft 14 remains stationary at a defined position having rotated its scale 9 through an angle which is also defined. The other cam shaft will be rotated in corresponding manner by its motor 15 until the contact spring (not shown), connected in parallel to the first contact spring 11 comes into contact with its associated cam 20. Accordingly, the supply of current for the electric motor 15 is again interrupted through a relay 24 and a normally closed contact 25 so that the scale 8 will also stop at a defined position. The entire process takes place in the short period of time required by the measuring apparatus to inflate the sleeve so that in the ensuing discharge of the pressure and the appearance of the Korotkoff sounds both scales shall have been rotated in the correct manner relative to the pointer 10 (not shown in FIG. 5). In order to prevent overshoot of the cam shaft 14, 17 it is possible for the relays 22, 24 to be provided with normally open contact by means of which they actuate a combined braking aid return run unit 26, 27 of the two motors; the motors will then remain in the braked position for as long as the main switch 21 is switched on; as soon as the instrument is switched off with the switch 21, the brake will also be released so that the appropriate return traversing apparatus — for example a spring motor wound up by the motor 12 — returns the cam shaft 14 into its starting position. The pointer 10 of the indicator unit 7' may be rotated in any desired manner by the effective pressure in the bandage 1; electric pressure transducers which rotate the pointer 10 in accordance with the picked-off pressure through an amplifier, not shown, are commonly used to this end.

Figure 7:
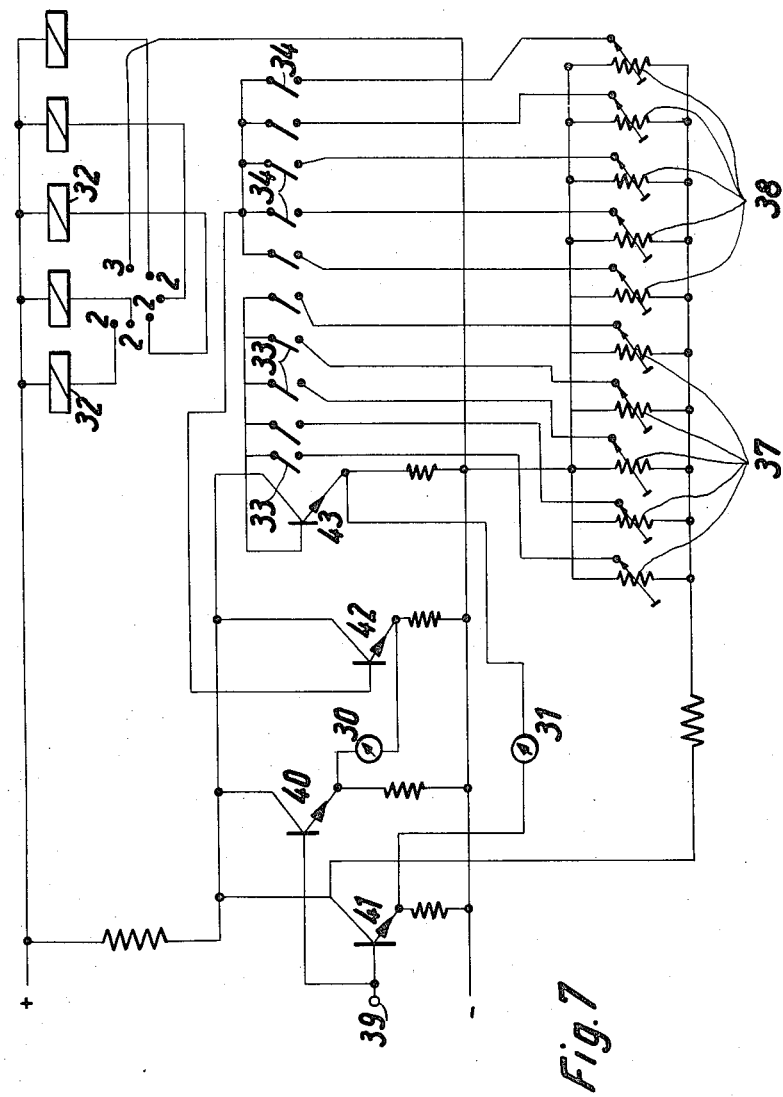
FIG. 7 is a circuit diagram for zero shift of the pointers of two indicating units relative to the effective length of the bandage.

Two indicating units 30, 31, the scales of which are stationary, and the pointer position of which is influenced by the effective length of the bandage 1 are shown in the embodiment illustrated in FIG. 7. Each individual contact 2 is associated with a relay 32 having two normally open contacts 33, 34. All normally open contacts 33 are connected to a common busbar 35 and all NO-contacts 34 are connected to a common busbar 36. When actuated, each normally open contact 33 and 34 connects a trimmer resistor 37, 38, connected to the positive terminal, to the busbar 35 or 36 respectively. It will be seen that two trimmer resistors 37, 38 are provided for each individual contact 2, and these trimmer resistors may be differently adjusted in accordance with the correcting values applicable to the systolic and diastolic pressure.

The electric signal produced by a pressure transducer, which is not shown, is applied to a terminal 39 and from there is transferred to two transistors 40, 41 the bases of which are connected as shown. The indicating unit 30 is connected into the emitter circuit of the transistor 40 and the indicating unit 31 is connected into the emitter circuit of the transistor 41 and both indicating units are connected through a further transistor 42, 43 to the busbar 36 or 35 respectively.

The current which flows between the transistors 40 and 42 or between the transistors 41 and 43 and which is indicated by the indicating units 30 or 31 respectively is a function of the common input signal applied to the terminal 39 and also depends on the voltage applied to the busbar 36 or 35 respectively. The last mentioned voltage in turn depends on the setting of the trimmer resistors 38 or 37 respectively of which one at a time is connected by means of the normally open contacts 34 or 33 respectively to the busbars when one of the relays 32 is energised. Since each individual contact 2 is associated with a relay 32 and therefore a trimmer resistor is provided for the systolic and the diastolic pressure, the pressure value indicated by the indicating units 30 or 31 respectively depends on the effective length of the bandage so that when the blood pressure is measured it is merely necessary for the bandages to be applied whereupon the automatically corrected pressure value indicated by the two indicating units may be read off.

Figure 8:
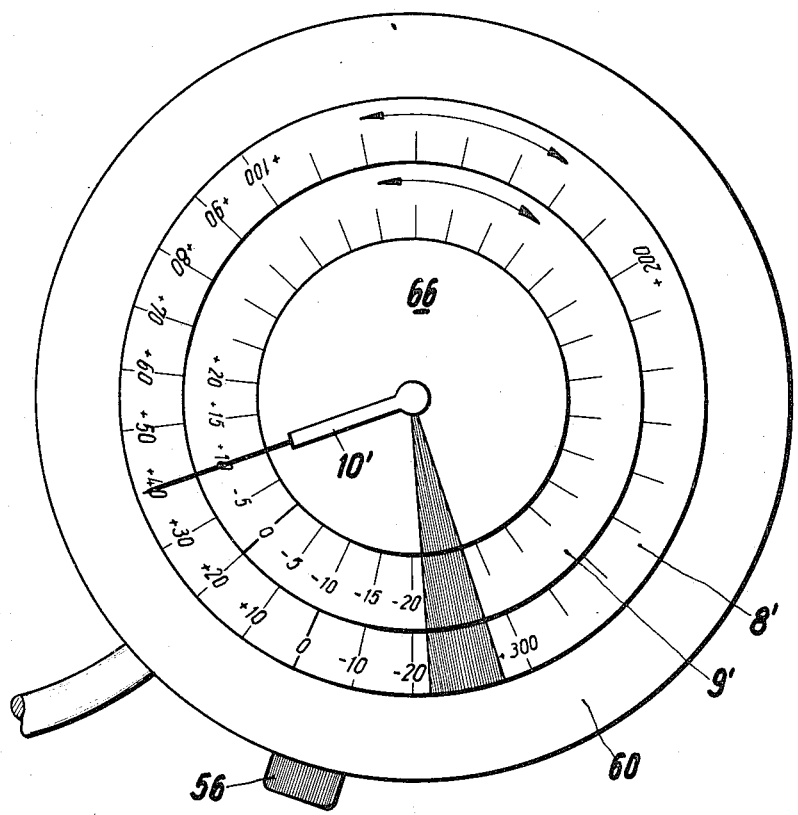
FIG. 8 is the plan view of another embodiment of an indicating unit with two scales which are rotatable relative to each other and to the pointer.
Figure 9:
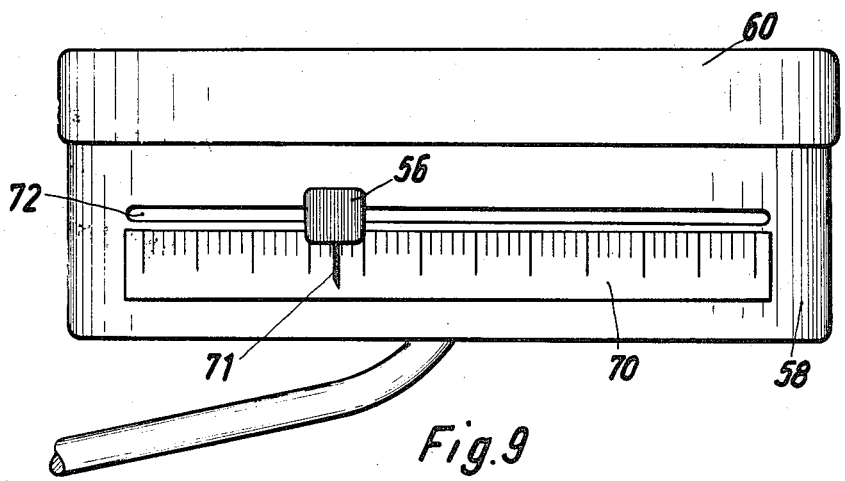
FIG. 9 is a side view of the embodiment illustrated in FIG. 8.

Two scales 8', 9', disposed in a common plane and being rotatable relative to each other are once again provided in the embodiment illustrated in FIGS. 8 to 10. The said two scales are coupled to each other by a total of four gear wheels 50, 51, 52, 53. The gear wheels 50 and 51 have a transmission ratio of 1 : 2, the two gear wheels 51 and 52 are rigidly coupled to each other and the gear wheels 52 and 53 have a reduction ratio of 1 : 1.

The gear wheel pairs 50, 51 on the one hand as well as 52, 53 on the other hand are disposed in separate planes which have a defined distance from each other and from the scales 8′, 9′ and extend in parallel thereto. The externally disposed scale 8′ comprises of a flat ring connected through, for example, three downwardly and inwardly extending supports 54 to the gear wheel 50. The gear wheel 50 is rotatably mounted on a hollow shaft 55 so that rotation of the gear wheel 50 causes the outer scale 8′ to be rotated by the same amount. A handle 56, coupled to the gear wheel by means of a rod 57 which extends radially from the gear wheel 50 is provided for the drive thereof.

The gear wheels, scales and a pointer 10′ are disposed within a housing 58 the upper endface of which is covered by a disc 59 constructed of glass or the like. The glass disc is retained on the housing 58 by means of a ring 60. The two gear wheels 51 and 52, disposed at a distance from each other but being fixedly coupled to each other through a shaft 61, are supported within the housing in a bearing 62. The gear wheel 53, which meshes with the gear wheel 52, is disposed axially above the gear wheel 50 and is retained in its position by means of a hollow spacer 63. Supports 64, for example three such supports, extend upwardly from the gear wheel 53 to support the inner scale 9′. A cover plate 66 is retained at the level of the scales 8′, 9′ by means of a further hollow spacer 65 so that the scales are disposed in a plane common to the cover plate. The cover plate 66 may be fixedly disposed in the housing 58. The pointer 10′ is mounted on a spindle 67 which traverses through the cover plate 66, the spacers 65 and 63 and through the hollow shaft 55 and is connected to pressure measuring means which are not shown. The spindle 67 and the pointer 10′ are therefore adjusted in accordance with the measured pressure. The pressure values are indicated on the scales 8′, 9′.

The convergence or varying slope of the pressure deviation curves of the diastolic and systolic pressure have already been pointed out earlier (see FIg. 1). It has been found that the convergence of the two curves can be ignored in practice: the difference in the slope is relatively slight so that, assuming an identical slope of both curves, the measuring error is at least partially within the indicating accuracy of the measuring unit and may therefore be neglected even if the deviation is more substantial. If a mean value of the two slope values is formed, the following relationship of relatively disposed correcting values will be obtained:

| Systole | +20 | +10 | 0 | −10 | −20 |
|---|---|---|---|---|---|
| Diastole | 0 | −5 | −10 | −15 | −20 |

The correcting value for the diastole therfore is displaced in each case by an amount of 5 while the correcting value for the systole is displaced in each case by 2 × 5 = 10. The ratio of displacement is therefore 1 : 2.

Proceeding therefrom, the transmission ratio of the gear wheels 50, 51 was defined at 1 : 2. This value would alter if it were based on other slopes. Rotation of the gear wheel 50 and of the outer scale 8′ fixedly joined thereto by appropriate displacement of the handle 56 causes the scale 9′ to be moved in the same direction but by only half the amount traversed by the scale 8′ so that the pointer 10′ automatically indicated the corrected values.

To measure the blood pressure a bandage similar to that illustrated in FIG. 2 is employed although no electrically insulated contacts or the like are required for this embodiment. Instead, the bandage is sub-divided into a number of zones or is otherwise scaled in the longitudinal orientation of the bandage. When the bandage is applied, its free end is disposed over a defined zone or defined division of the scale. The zones are differently designated, for example by consecutive numbers of different colours so that different designations at the free end of the bandage are disposed opposite each other in accordance with limbs of different thickness.

The circumference of the housing 58 is also provided with a scale 70, sub-divided into zones or is scaled and the designations of which correspond with those of the bandage. Furthermore, a pointer 71, extending from the handle 56 over the scale, is also provided. After applying the bandage it is therefore merely necessary for the handle 56 to be rotated until the pointer 71 is disposed over a designation of the scale 70 which is identical to that designation which is noted at the free end of the bandage after the application thereof. Measurement may proceed immediately following such application because the correcting value has been automatically fed into the pressure measuring apparatus by the appropriate adjustment of the handle 56.

The advantage of this embodiment is due substantially to its lack of complexity which has no effect on the measuring accuracy. The lack of complexity enables the apparatus to be inexpensively produced and permits it to be operated by those without technical skill.

I claim:

1. Apparatus for measuring blood pressure comprising an inflatable bandage and a pressure measuring indicating means connected thereto, said indicating means having separate indicating ranges and said bandage being sub-divided into a plurality of sections along its longitudinal dimension, each of the said sections being associated with its own indicating range in the indicating means in accordance with the effective length of the bandage in operative position.

2. Apparatus according to claim 1, characterised in that the sections of the bandage comprise zones of different colouring and the indicating ranges are correspondingly coloured for association with a similarly coloured bandage section.

3. Apparatus according to claim 1, characterised in that the bandage is provided with a common contact in the zone of one of its ends and a number of individual contacts along the length thereof selectively engageable with said common contact providing a circuit corresponding to the appropriate individual contact and therefore corresponding to the effective length of the bandage, the said circuit including switch means to activate the associated indicating range in the measuring and indicating means.

4. Apparatus according to claim 3, characterised in that the common contact consists of a hook and the individual contacts of separate metal rods extending transversely to the longitudinal orientation of the bandage.

5. Apparatus according to claim 3, characterised in that there are provided separate indicating means, first and second busbars and a separate relay for each bandage section, with each relay having two normally open contacts of which the first normally open contact is connected on the one hand to a first busbar, connected in the circuit of a first indicating means and of which the second normally open contact is connected on the one hand to a second busbar which is connected in the circuit of a second indicating means; and separate trimmer resistors connected to the other normally open contacts which complete the circuits of the two indicating means.

6. Apparatus according to claim 1, characterised in that tee measuring and indicating means comprises a pointer and at least one scale and in that there are provided means mounting the same for rotation relative to each other in accordance with the effective length of the bandage.

7. Apparatus according to claim 6, characterised in that there are plural gear wheels and plural scales formed by rings mounted coaxially relative to as well as on separate gear wheels with one gear wheel rotatable in accordance with the effective length of the bandage and coupled to the other gear wheel through a predetermined fixed step-down ratio.

8. Apparatus according to claim 7, characterised in that the step-down ratio is 1 : 2.

9. Apparatus according to claim 7, characterised in that there is provided at least one further gear wheel pair coupling the two gear wheels which are disposed coaxially one below the other and below the scales and wherein the further gear wheel pair comprises two gear wheels which are disposed coaxially relative to each other and are mounted on a common shaft.

10. Apparatus according to claim 9, characterised in that there is a common hollow shaft for the first two gear wheels to run independently of each other and through which hollow shaft a spindle for the pointer traverses.

11. Apparatus according to claim 7, characterised in that there is a manual drive for the one gear wheel whereby it can be manually rotatable to a position corresponding to the effective length of the bandage.

12. Apparatus according to claim 11, characterised in the provision of a housing with a circumferential slit therethrough and an associated scale and with the manual drive of the one gear wheel comprising an outwardly extending rod the free end of which has a handle upon it, said rod being fixedly connected to the said one gear wheel and extending radially therefrom through the slit of the housing, the handle having a pointer for sliding over the scale on the housing circumference by rotation of one of the gear wheels.

13. Apparatus according to claim 7, characterised in that there is provided means for electrically and automatically rotating the one gear wheel in relation to the effective length of the bandage through the contacts.

14. Apparatus according to claim 7, characterised in that there are provided spaced supports for mounting the rings forming the scales on their respective gear wheel and that the supports, extending approximately axially from the gear wheel side surfaces, are disposed at distances of approximately 120° relative to each other.

* * * * *